United States Patent
Pérez Acal et al.

(10) Patent No.: US 12,329,224 B2
(45) Date of Patent: Jun. 17, 2025

(54) ACTIVE NECK PROTECTION SYSTEM

(71) Applicant: Airbus Defence and Space GmbH, Taufkirchen (DE)

(72) Inventors: Antonio Pérez Acal, Taufkirchen (DE); Alasdair Cook, Taufkirchen (DE); Isabel Tannert, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 74 days.

(21) Appl. No.: 18/190,277

(22) Filed: Mar. 27, 2023

(65) Prior Publication Data

US 2023/0309640 A1    Oct. 5, 2023

(30) Foreign Application Priority Data

Mar. 30, 2022    (EP) .................................... 22165537

(51) Int. Cl.
*A42B 3/04*    (2006.01)
*B60R 21/02*    (2006.01)
(Continued)

(52) U.S. Cl.
CPC ............ *A42B 3/0473* (2013.01); *A42B 3/046* (2013.01); *B60R 21/02* (2013.01); *B64D 10/00* (2013.01);
(Continued)

(58) Field of Classification Search
CPC ....... A42B 3/0473; A42B 3/046; B60R 21/02; B60R 2021/0048; B60R 2021/0093; B60R 2021/0206; B64D 10/00
See application file for complete search history.

(56) References Cited

U.S. PATENT DOCUMENTS 4,477,041 A * 10/1984 Dunne ................. A42B 3/0473
297/475
4,638,791 A * 1/1987 Krogh ..................... B64D 10/00
128/204.23
(Continued)

FOREIGN PATENT DOCUMENTS

GB       2289615 A       11/1995

OTHER PUBLICATIONS

European Search Report for Application No. 22165537 dated Aug. 25, 2022.

*Primary Examiner* — Frank B Vanaman
(74) *Attorney, Agent, or Firm* — KDW Firm PLLC

(57) ABSTRACT

A neck protection system includes a support structure, helmet, force transmission arrangement, actuator arrangement, sensor arrangement, and controller. The force transmission arrangement is coupled to the support structure and the helmet and applies a relative force between them. The actuator arrangement applies a load to the force transmission arrangement to initiate the relative force between the support structure and the helmet. The sensor arrangement measures movement changes of a vehicle. The controller is connected to the sensor arrangement to receive data representing the measured movement changes, and connected to the actuator arrangement, and generates and sends control commands to the actuator arrangement based on which the actuator arrangement applies the load to the force transmission arrangement. The controller receives maneuver information from a control computer of a vehicle and generates the control commands based on the received maneuver information and/or based on measurements of the sensor arrangement.

15 Claims, 2 Drawing Sheets

(51) Int. Cl.
  *B64D 10/00* (2006.01)
  *B60R 21/00* (2006.01)
(52) U.S. Cl.
  CPC ............... *B60R 2021/0048* (2013.01); *B60R 2021/0093* (2013.01); *B60R 2021/0206* (2013.01)

(56) References Cited

U.S. PATENT DOCUMENTS

| | | | |
|---|---|---|---|
| 4,736,731 A * | 4/1988 | Van Patten | A62B 17/008 600/20 |
| 4,967,985 A | 11/1990 | Deakin | |
| 5,272,422 A | 12/1993 | Beaussant | |
| 2003/0088906 A1 | 5/2003 | Baker | |
| 2007/0028370 A1 * | 2/2007 | Seng | A41D 13/1281 2/410 |
| 2009/0158509 A1 * | 6/2009 | Ghajar | A42B 3/0473 2/102 |
| 2012/0296601 A1 * | 11/2012 | Eatwell | G01P 15/18 702/141 |
| 2015/0364045 A1 * | 12/2015 | Lissajoux | G08G 5/21 701/3 |
| 2020/0283150 A1 * | 9/2020 | Tsukada | A61H 9/0078 |

* cited by examiner

ACTIVE NECK PROTECTION SYSTEM

TECHNICAL FIELD

The disclosure herein relates to a neck protection system and a vehicle with such a neck protection system. In particular, the description relates to a neck protection system for a pilot of an aircraft.

BACKGROUND

During operation of a vehicle, specific external forces may be applied to occupants or operators of the vehicle when the vehicle performs movements to follow a trajectory or when the vehicle performs ad-hoc movements. Such external forces may be of such an extent that they may cause harm or injury to the occupants or operators when they occur suddenly and with rapid changes of their direction of action or when they occur at an extreme extent.

For example, in aircraft, a force along all three spatial axes or a moment of force about these three spatial axes may occur, thus applying load to the occupants like the pilot and the co-pilot. In particular, such loads may result in unintended movement especially of the head of the pilot which may be detrimental to the pilot's task of operating the aircraft or any other vehicle. Furthermore, such loads may cause damages to the pilot's neck or spine.

SUMMARY

It may be seen as an object to reduce the effect of external forces and moments applied to the occupants of a vehicle that result from movements of the vehicle. This object is solved by the subject matter disclosed herein.

A neck protection system is disclosed herein. Further developments can be derived from the following description.

According to an aspect, a neck protection system comprises a support structure, a helmet, a force transmission arrangement, an actuator arrangement, a sensor arrangement, and a controller. The force transmission arrangement is mechanically coupled to the support structure and to the helmet and configured to apply a relative force between the support structure and the helmet. The actuator arrangement is mechanically coupled with the force transmission arrangement and configured to apply a load to the force transmission arrangement to initiate the relative force between the support structure and the helmet. The sensor arrangement is configured to sense movement changes of the vehicle. The controller is communicatively connected to the sensor arrangement and configured to receive data representing the sensed movement changes of the vehicle. The controller is communicatively connected to the actuator arrangement and configured to generate and send control commands to the actuator arrangement based on which the actuator arrangement applies the load to the force transmission arrangement. The controller is configured to receive maneuver information from a control computer of a vehicle and to generate the control commands for the actuator arrangement based on the received maneuver information and/or based on the sensed movement changes of the vehicle.

Generally, the neck protection system is configured to take loads applied by the helmet to a pilot's head, neck, or spine during operation of a vehicle like a car, aircraft, or spacecraft. The helmet may also support the pilot's head, neck, or spine when high forces are applied thereto during a maneuver of the vehicle. To do so, the helmet is mechanically coupled to the support structure by a force transmission arrangement. The support structure is typically attached to the pilot's chest, shoulder, and/or back. Therefore, the helmet is supported against the pilot's chest, shoulder, and/or back. As a result, the pilot's head and/or neck is supported relative to the pilot's chest, shoulder, and/or back.

The force transmission arrangement may include one or more force transmission elements. Each force transmission element is configured and designed to apply a push force and/or a pull force and/or affix the helmet with respect to the support structure. For example, the force transmission element may be a rod assembly, a pull rope or cable, a gear rack, etc.

The controller may be part of the support structure or the helmet. Alternatively, the controller may be arranged remotely from the support structure and/or the helmet and send control commands to the actuator arrangement as to how to control the force transmission arrangement.

The controller is configured to receive maneuver information from the vehicle control computer, e.g., a flight control computer of an aircraft. Based on the maneuver information, the controller is able to predictively generate control commands for the force transmission arrangement so that the force transmission arrangement can apply relative forces between the support structure and the helmet and locate or hold the helmet in a predetermined position before external forces resulting from a maneuver of the vehicle can move the helmet in an uncontrolled manner. In addition, the controller is communicatively connected to the sensor arrangement and configured to receive data representing the sensed movement changes of the vehicle. The controller can then generate control commands for the actuator arrangement based on the received maneuver information and/or based on the sensed movement changes of the vehicle.

The controller may be connected to a control computer of the vehicle and configured to receive maneuver information and/or connected to sensors mounted to the vehicle. The controller generally commands the actuator arrangement as described herein. However, the controller does not necessarily need to be communicatively connected to a control computer of the vehicle. The controller may operate with data representing measured movement changes of the vehicle retrieved from the sensor arrangement. A neck protection system of this variant may be used in less sophisticated vehicles without a control computer.

The sensor arrangement may include one or more sensors that are capable of measuring data that indicate movement changes and/or accelerations of the vehicle. For example, the sensor arrangement includes one or more accelerometers.

The sensor arrangement and at least some or all of its sensors may be coupled to the vehicle. However, all or some of the sensors of the sensor arrangement may also be coupled to the neck protection system, e.g., to the support structure and/or to the helmet.

Hence, the controller described herein is able to predict external forces applied to the vehicle which act on the helmet and/or the pilot's head, neck, and spine based on the movement changes of the vehicle and can command the force transmission element to relatively locate or hold the helmet with respect to the support structure.

According to an embodiment, the maneuver information includes values describing a trajectory of the vehicle.

The maneuver information includes, for example, a movement path, velocity, time, and/or position information of the vehicle. Based on the maneuver information, the controller is able to determine which forces result from the movement of the vehicle and when these forces are applied as external forces to the helmet. The controller then proactively commands the actuator arrangement to apply a load to the force transmission arrangement in order to damp, absorb, or reduce sudden movements of the helmet with respect to the support structure. In other words, the neck protection system restrains the head of the pilot from sudden movements that result from the external forces that act on the pilot's head and on the helmet.

According to another embodiment, the force transmission arrangement is arranged to restrain a rotational movement of the helmet about one or more spatial axes.

According to another embodiment, the force transmission arrangement is arranged to restrain a translational movement of the helmet along one or more spatial axes.

In one example, the neck protection system is configured to restrain movement of the helmet in all six degrees of freedom. The helmet of this example can be particularly used in military aircraft which apply high external forces to the helmet worn by a pilot or co-pilot. Movement of the helmet about and along the roll-axis (X-axis), pitch-axis (Y-axis), and yaw-axis (Z-axis) may be restrained by the actuator arrangement together with the force transmission arrangement based on the control commands generated and sent by the controller. In other use cases, it might not be necessary to restrain movement of the helmet with all six degrees of freedom. In land vehicles, for example, it might only be necessary to restrain rotational movement about the roll-axis and the pitch-axis and translational movement along all three spatial axes, i.e., restrain movement with five degrees of freedom. Other use cases are conceivable in which movements with four or less degrees of freedom are restrained. Generally, the neck protection system can be modified by using an appropriate number of force transmission elements with a given force application direction to restrain movement of the helmet along and about spatial axes which are relevant for the respective use case.

According to another embodiment, the force transmission arrangement includes one or more force transmission elements that are arranged to interconnect the support structure and the helmet.

The number of the force transmission arrangements may be chosen depending on the degrees of freedom in which the movement of the helmet is to be restrained. For example, when rotational or translational movement about or along a single spatial axis is to be restrained, one or two force transmission elements may be sufficient. However, with a higher number of force transmission elements, movement along or about more spatial axes can be restrained.

According to another embodiment, each force transmission element is designed to apply a pulling force and/or a pushing force between the helmet and the support structure.

With a force transmission element that applies a pulling force between the helmet and the support structure, it may be prevented that the distance between the helmet and the support structure along the longitudinal direction of the force transmission element increases beyond the extent of elastic deformation of the force transmission element and results in an unnatural and inconvenient position of a human operator or occupant. With a force transmission element that applies a pushing force between the helmet and the support structure, it may be prevented that the distance between the helmet and the support structure along the longitudinal direction of the force transmission element falls below the length of the force transmission element (in consideration of elastic deformation) and results in an unnatural and inconvenient position of a human operator or occupant.

Force transmission elements may be used that apply a pulling force or a pushing force or both.

According to another embodiment, each force transmission element includes at least one of a rope, a cable, and a rod like structure.

A rope or a cable can apply a pulling force but no pushing force. A rod like structure may be a rigid or stiff rod, bar, pole, stick, etc., and can apply a pushing force and a pulling force between the helmet and the support structure.

According to another embodiment, the actuator arrangement includes at least one of an electromechanical drive, a pneumatic drive, a magnetic drive, and a hydraulic drive.

The actuator arrangement may include multiple drives (one or more electromechanical drives, one or more pneumatic drives, one or more hydraulic drives, one or more magnetic drives), wherein all drives are of the same type (all electromechanical, all pneumatic, all hydraulic, all magnetic) or wherein drives of different types are implemented in the actuator arrangement.

At least one drive of the actuator arrangement is coupled to a respective one of the force transmission elements and is configured and arranged to apply a load to the force transmission element. For example, the drive applies a load to the assigned force transmission element and holds the force transmission element in a predetermined position so that the helmet is held in position.

Each drive of the actuator arrangement may be coupled with the respectively assigned force transmission element by rolls, transmission drives, gears, or the like, such that the drive can apply a load to the force transmission element and bring or hold the helmet in a desired position. Multiple drives may apply a respective load to locate the helmet in a desired position or bring the helmet into the desired position.

According to another embodiment, the controller is configured to command the actuator arrangement to bring the helmet into a predetermined target position.

In this embodiment, the actuator arrangement is commanded to bring the helmet into a target position which may be a normal, comfortable position during a sustained high G maneuver. The drives of the actuator arrangement apply a load to the force transmission elements to move the helmet accordingly.

According to another embodiment, the sensor arrangement is configured to sense external forces applied to the vehicle and/or to the helmet. The sensor arrangement is communicatively coupled to the controller and configured to communicate the sensed external forces to the controller.

The sensor arrangement includes, for example, one or more accelerometers that are configured to sense forces (in particular forces resulting from movement changes of the vehicle) in one or more directions. Particularly, the sensor arrangement is configured to sense external forces that actually act on the vehicle during operation of the vehicle. For that purpose, the sensors of the sensor arrangement may be structurally coupled with the vehicle and/or to a part of the neck protection system to be able to sense accelerations of the vehicle and/or of the helmet in one or more directions.

According to another embodiment, the controller is configured to determine whether external forces sensed by the sensor arrangement are below a threshold value. The controller is configured to command the actuator arrangement to not apply any load to the force transmission arrangement when the sensed external forces are below the threshold value.

When the external forces acting upon the vehicle are below a threshold value, the helmet is not actively held in position by the force transmission arrangement and the pilot may move their head freely without being restricted by the neck protection system.

According to another embodiment, the controller is configured to determine whether the external forces sensed by the sensor arrangement exceed the threshold value. The controller is configured to command the actuator arrangement to apply load to the force transmission arrangement when the sensed external forces exceed the threshold value.

When the external forces that act upon the vehicle exceed the threshold value, the actuator arrangement starts applying a load to the force transmission arrangement to hold the helmet and/or the pilot's head in order to reduce the forces acting on the pilot's head, neck, and/or spine.

According to another embodiment, the controller is configured to command the actuator arrangement to apply increasing loads to the force transmission arrangement when the sensed external forces exceed the threshold value in a manner that the applied load is proportional to the sensed external forces.

With increasing forces that act upon the vehicle, the stiffness or rigidity of the system, i.e., the load applied to the force transmission arrangement may also increase to increasingly support the pilot's head, neck, and/or spine.

In one embodiment, the controller is configured to command the actuator to apply a force to the helmet to hold the weight of the helmet and/or follow pilot's head movement in a natural way. The force to hold the helmet's weight can be applied as an offset in addition to any force that is applied in accordance with any one of the embodiments described above in which a force or no additional force is applied to hold or move the helmet. Motion of the protection system shall be transparent and go unnoticed to the pilot. The protection system senses pilot's head position and also motion. Sensors of the protection system mounted to the helmet can feel little pressure and react accordingly very quickly, with minimal to zero latency.

According to another aspect, a vehicle is provided that comprises a neck protection system as described herein and a control computer. The control computer is communicatively connected to the neck protection system and configured to transmit maneuver data of the vehicle to the neck protection system.

The sensor arrangement and its sensor(s) may be attached to the vehicle and/or to the neck protection system so that they can sense movement changes of the vehicle and/or of the helmet. Thus, the neck protection system receives maneuver data and/or data representing movement changes of the vehicle and/or of the helmet, and the controller of the neck protection system is able to predict external forces that act upon the helmet based on maneuver data and/or based on data measured by the sensor arrangement that is mounted to the vehicle and/or to the neck protection system or one of its components. The prediction of the external forces acting upon the helmet may be done by using higher order prediction equations, like $2^{nd}$ order prediction equations. The controller can thereby command the actuator to restrain movements of the helmet in a predictive manner based on the received maneuver data.

According to an embodiment, the vehicle is an aircraft, and the control computer is a flight control computer of the aircraft.

Thus, in one embodiment, the neck protection system is communicatively connected with a flight control computer and receives maneuver data which are used to affix or position the helmet of the pilot and/or co-pilot based on the information received from the flight control computer. The neck protection system not only reacts on forces that are sensed at the helmet but uses predictive data based on the maneuver data to add rigidity and/or stiffness to the helmet with respect to the support structure before the forces actually occur. When the maneuver data indicate that no sudden direction changes are going to happen within a predetermined time, the fixation of the helmet may be released or its rigidity reduced to allow flexibly moving the head.

BRIEF DESCRIPTION OF THE DRAWINGS

The subject matter will hereinafter be described in conjunction with the following drawing figures, wherein like numerals denote like elements, and wherein.

DETAILED DESCRIPTION

Figure 1:
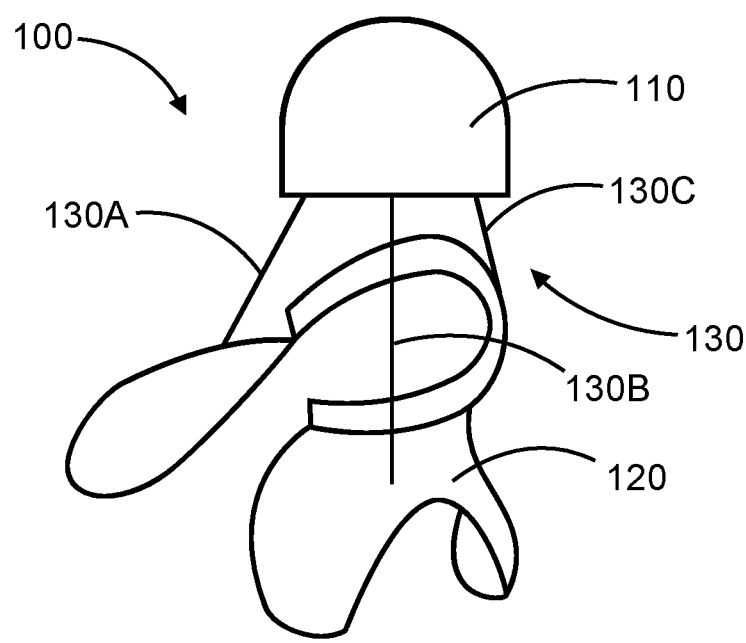
FIG. 1 is a schematic representation of a neck protection system.

The following detailed description is merely exemplary in nature and is not intended to limit the disclosure herein and uses of the disclosure herein. Furthermore, there is no intention to be bound by any theory presented in the preceding background or the following detailed description.

The representations and illustrations in the drawings are schematic and not to scale. Like numerals denote like elements.

A greater understanding of the described subject matter may be obtained through a review of the illustrations together with a review of the detailed description that follows.

FIG. 1 shows a neck protection system 100 with a helmet 110, a support structure 120, and a force transmission arrangement 130 with three force transmission elements 130A, 130B, 130C that mechanically couple the helmet 110 to the support structure 120.

The helmet 110 can be held in position or brought into a desired position by the force transmission elements 130A, 130B, 130C so that external forces that act upon the helmet 110 are not transferred to a wearer's head. The support structure 120 is attached to the wearer's chest, shoulders, and back and the helmet 110 as well as the head of the wearer are then affixed with respect to the support structure 120. The neck protection system 100 may be worn by a pilot, co-pilot, or any other member of the crew of an aircraft, e.g., a military aircraft. It should be understood that any reference to a pilot or any other human operator is not intended to be limited to a pilot, but the neck protection system can be worn by any human occupant of a vehicle. Similarly, any references to an aircraft are not intended to limit the disclosure herein to be used in aircraft, the neck protection system can be used in different kinds of vehicles like land vehicle, spacecraft, watercraft, aircraft, etc.

The neck protection system 100 takes the load of the helmet 110 off the pilot's neck during normal operations and also when the aircraft performs a sudden maneuver to avoid that the pilot suffers damages to their spine or neck.

The neck protection system 100 can be logically connected to a flight control system (like the flight control computer 310 shown in FIG. 4), which manages aircraft motion and can predict linear and angular accelerations in all six degrees of freedom before a maneuver is actually executed. On a typical implementation, the neck protection system 100 physically connects the pilot's chest, shoulder and back to the helmet 110, although there might be some light implementations where less attachments are needed for example for cars or aerobatic applications.

Figure 2:
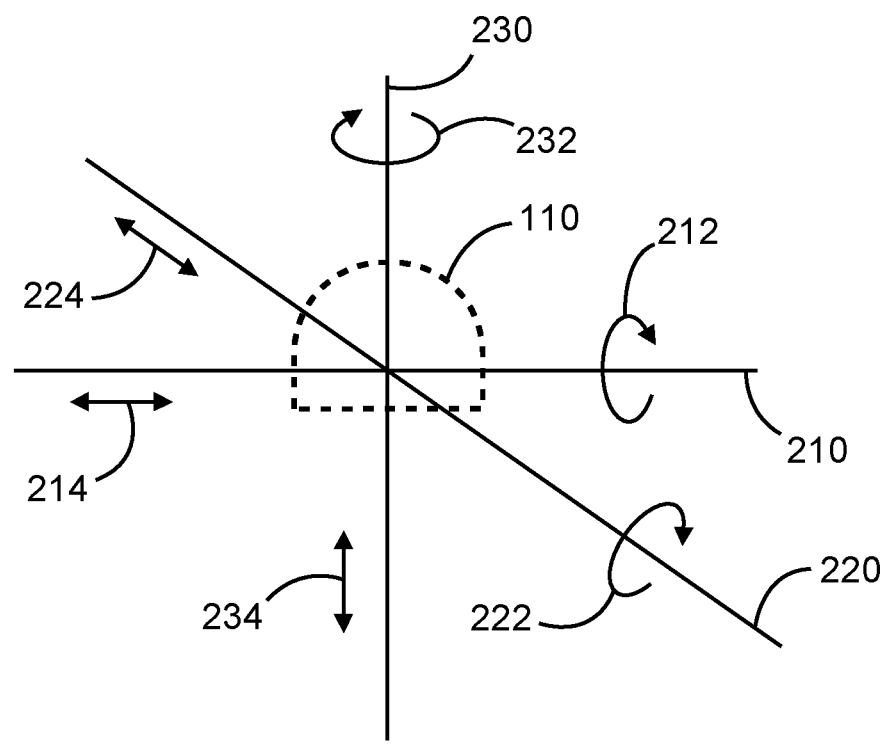
FIG. 2 is a schematic representation of a helmet with possible movement directions in space.

FIG. 2 shows possible movements of the helmet 110 which is indicated with dashed lines in the center of the drawing. The helmet 110 may be subject to external forces and torques to move along and about three spatial axes 210 (X-axis), 220 (Y-axis), 230 (Z-axis). The helmet 110 may perform a roll movement 212 about the X-axis 210 and/or a translational movement 214 in both directions along the X-axis 210. Additionally or alternatively, the helmet 110 may perform a pitch movement 222 about the Y-axis 220 and/or a translational movement 224 in both directions along the Y-axis 220. Additionally or alternatively, the helmet 110 may perform a yaw movement 232 about the Z-axis 230 and/or a translational movement 234 in both directions along the Z-axis 220. It is understood that the helmet may carry out movements which include components in multiple or all of the indicated directions at the same time.

With reference to FIG. 1, the force transmission elements 130A, 130B, 130C may be applied with loads by the actuator arrangement to restrain the helmet 110 from one or more of the rotational and/or translational movements shown in and described with reference to FIG. 2.

Figure 3:
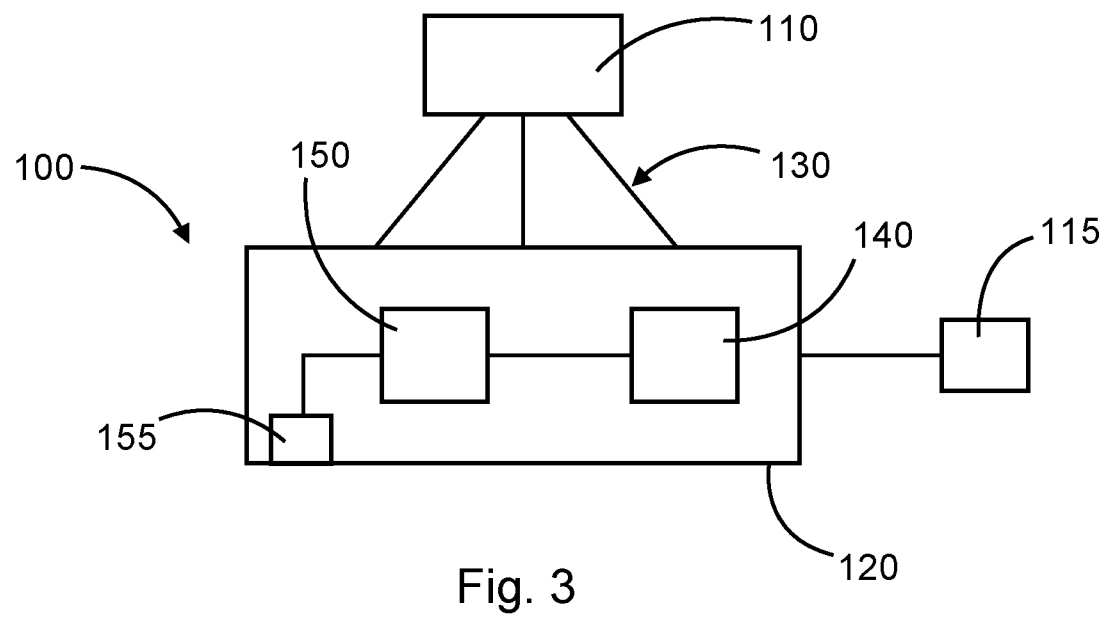
FIG. 3 is a schematic representation of structural and functional components of a neck protection system.

FIG. 3 shows a schematic representation of the structural and functional components of the neck protection system 100.

The system 100 includes a sensor arrangement 115. For example, the sensor arrangement 115 is mechanically coupled to the vehicle 300 (see FIG. 4) or to any one of the components of the neck protection system (e.g., to the support structure and/or to the helmet). The sensor arrangement 115 is configured to sense forces and/or movement changes applied to the vehicle and/or to the helmet, e.g., by measuring an acceleration in a certain direction. The sensor arrangement 115 may include one or more sensors, each of which are positioned and configured to detect a force in a certain direction.

The support structure 120 includes an actuator arrangement 140 and a controller 150. The controller 150 is communicatively coupled with the actuator arrangement 140 to send control commands thereto. The support structure 120 includes a communication interface 155 that is configured to be communicatively coupled (by wire or wireless) to a control computer of a vehicle to receive maneuver data. Based on the maneuver data, the controller 150 generates control commands and sends those to the actuator arrangement 140. The actuator arrangement applies a load to one or more force transmission elements of the force transmission arrangement to restrain the helmet 110 from uncontrolled movement resulting from forces that suddenly occur during a maneuver.

The controller 150 may be structurally assigned to the support structure 120. However, the controller 150 may also be remote from the support structure 120 and configured to transmit the control commands to the actuator arrangement 140 which then applies the commanded loads to the force transmission arrangement 130.

Figure 4:
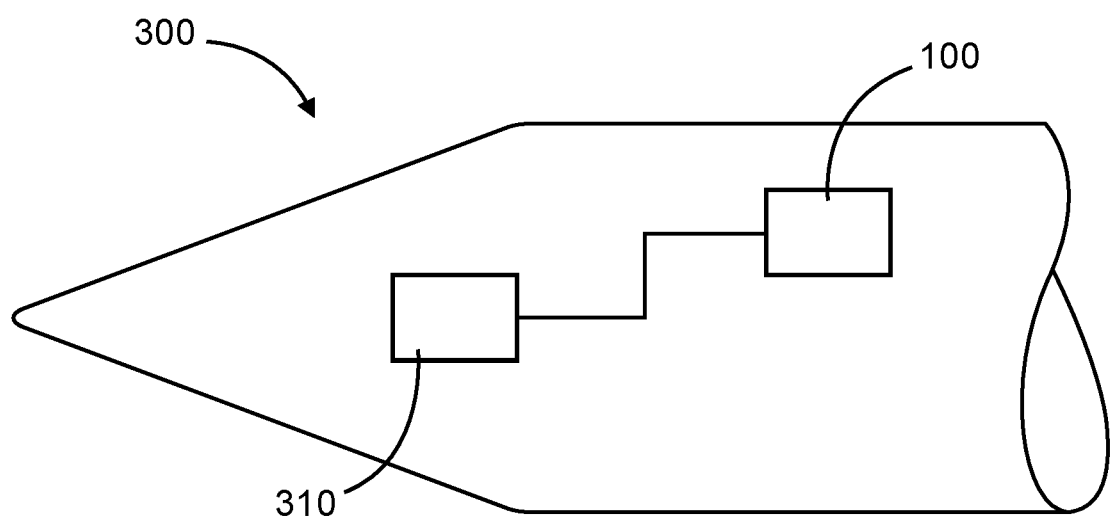
FIG. 4 is a schematic representation of a vehicle with a neck protection system.

FIG. 4 shows a vehicle 300, e.g., an aircraft, with a control computer 310, e.g., a flight control computer, which is coupled to the neck protection system 100. The control computer 300 is communicatively coupled with the communication interface 155 of the neck protection system 100.

While FIG. 4 shows a vehicle 300 with one neck protection system 100, it is noted that the vehicle 300 may of course comprise multiple neck protection systems 100 that are connected to the control computer 300, wherein each neck protection system 100 is assigned to a different human occupant of the vehicle 300.

The neck protection system 100 may be described with the following functional and structural features: the neck protection system 100 receives or reads inputs from the flight control computer 310 and/or from internal sensors 115 like accelerators and pressure sensors that are attached to the aircraft 300 and/or to the helmet 110 to measure instantaneous loads to the helmet 110 resulting from movement changes of the aircraft 300. The helmet 110 is physically connected to the support structure 120 and to the chest and back of a pilot. The support structure 120 may actively hold the weight of the helmet 110 by the force transmission arrangement so that the pilot feels it as a very lightweight structure. If acceleration forces are below some threshold, the helmet 110 is not restrained from movement with respect to the support structure 120. The helmet 110 stays loose and no pressure or holding force is applied thereto, leaving the pilot free to move their head around. If the acceleration forces are going to go beyond some threshold, the system gets increasingly rigid to avoid any dangerous movement of the helmet 110 beyond the human limits of the neck motion. In some embodiments, the neck protection system 100 is configured to hold the helmet's weight, as described in detail above.

In some embodiments, dynamics, thresholds and response of the system can be set up by the pilot to allow more or less movements of the helmet 110 with respect to the support system 120. In other words, the rigidity of the force transmission arrangement 130 can be adjusted manually by a human operator and the controller 150 generates the control commands for the actuator arrangement in additional consideration of the corresponding input values.

In some embodiments, the system can be set up to safely bring pilots head back to a normal, comfortable position during a sustained high G maneuver. In some embodiments, the system can be set up to drive the pilot's head to a particular position and/or orientation during a sustained high G maneuver. For example, during a high positive G turn with no bank change, the helmet may be driven to look upwards for visual acquisition of the expected location of a target.

In a sustained high G turn, the system may be configured to understand where the pilot wants to move the head to (following for example pupil motion) and carefully redirects pilots head to that direction or to stick a certain position.

The advantages of the neck protection system 100 described herein are that it may reduce workload, fatigue and injuries to a pilot's neck, back, and/or spine and may protect the pilot's life in extreme situations. The reaction time to enter into sudden, complex maneuvers like missile avoidance is reduced since the system can react before the pilot even knows that the aircraft is going to move, because the neck protection system 100 receives the maneuver data from the flight control computer. The neck protection system 100 may protect the pilot's neck also in case of emergency ejection. The neck protection system can be integrated into existing vehicles or future manned vehicles like combat aircraft. In twin seater aircrafts, it protects the second occupant without need of communication between the second occupant and the pilot. The second occupant's neck protection will actively hold their helmet and will react to any sudden command coming from pilot's stick and throttle, thus reducing Crew Resource Management (CRM) requirement and thus further reducing the possibility of a mishap due to CRM failure.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment has been presented in the foregoing detailed description, it should be appreciated that a vast number of variations exist. It should also be appreciated that the example embodiment or example embodiments are only examples, and are not intended to limit the scope, applicability, or configuration of the disclosure herein in any way. Rather, the foregoing detailed description will provide those skilled in the art with a convenient road map for implementing an example embodiment of the disclosure herein. It will be understood that various changes may be made in the function and arrangement of elements described in an example embodiment without departing from the scope of the claims.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 100 neck protection system
110 helmet
115 sensor arrangement
120 support structure
130 force transmission arrangement
130A force transmission element
130B force transmission element
130C force transmission element
140 actuator arrangement
150 controller
155 communication interface
210 X-axis
212 roll movement
214 translational movement
220 Y-axis
222 pitch movement
224 translational movement
300 vehicle
310 control computer

The invention claimed is:

1. A neck protection system for a vehicle, the neck protection system comprising:
a support structure;
a helmet;
a force transmission arrangement;
an actuator arrangement; and
a controller;
wherein the force transmission arrangement is mechanically coupled to the support structure and to the helmet and configured to apply a relative force between the support structure and the helmet;
wherein the actuator arrangement is mechanically coupled with the force transmission arrangement and configured to apply a load to the force transmission arrangement to initiate the relative force between the support structure and the helmet;
wherein the controller is communicatively connected to the actuator arrangement and configured to generate and send control commands to the actuator arrangement based on which the actuator arrangement applies the load to the force transmission arrangement;
wherein the controller is configured to receive maneuver information from a control computer of the vehicle and to generate the control commands for the actuator arrangement based on the received maneuver information; and
wherein the maneuver information includes a movement path, velocity, time, and position information of the vehicle; and
wherein the controller is configured to, based on the maneuver information, determine forces resulting from a movement of the vehicle and also when such forces are applied as external forces to the helmet.

2. The neck protection system of claim 1, comprising:
a sensor arrangement;
wherein the sensor arrangement is configured to sense movement changes of the vehicle;
wherein the controller is communicatively connected to the sensor arrangement and configured to receive data representing the sensed movement changes of the vehicle; and
wherein the controller is configured to generate the control commands for the actuator arrangement based on the received maneuver information and based on the sensed movement changes of the vehicle.

3. The neck protection system of claim 2,
wherein the sensor arrangement is configured to sense external forces applied to the vehicle; and
wherein the sensor arrangement is communicatively coupled to the controller and configured to communicate the sensed external forces to the controller.

4. The neck protection system of claim 3,
wherein the controller is configured to determine whether external forces sensed by the sensor arrangement are below a threshold value; and
wherein the controller is configured to command the actuator arrangement to not apply any load to the force transmission arrangement when the sensed external forces are below the threshold value.

5. The neck protection system of claim 4,
wherein the controller is configured to determine whether the external forces sensed by the sensor arrangement exceed the threshold value; and
wherein the controller is configured to command the actuator arrangement to apply load to the force transmission arrangement when the sensed external forces exceed the threshold value.

6. The neck protection system of claim 5, wherein, when the sensed external forces exceed the threshold value, the controller is configured to command the actuator arrangement to apply increasing loads to the force transmission arrangement in a manner such that that the applied load is proportional to the sensed external forces.

7. The neck protection system of claim 1, wherein the force transmission arrangement is arranged to restrain a rotational movement of the helmet about one or more spatial axes.

8. The neck protection system of claim 1, wherein the force transmission arrangement is arranged to restrain a translational movement of the helmet along one or more spatial axes.

9. The neck protection system of claim 1, wherein the force transmission arrangement includes one or more force transmission elements that are arranged to interconnect the support structure and the helmet.

10. The neck protection system of claim 9, wherein each force transmission element of the one or more force transmission elements is configured to apply a pulling force and/or a pushing force between the helmet and the support structure.

11. The neck protection system of claim 9, wherein each force transmission element includes at least one of a rope, a cable, a gear rack, a rod assembly, and structure that comprises a rigid or stiff rod, a bar, a pole, or a stick.

12. The neck protection system of claim 1, wherein the actuator arrangement includes at least one of an electromechanical drive, a pneumatic drive, a magnetic drive, and a hydraulic drive.

13. The neck protection system of claim 1, wherein the controller is configured to command the actuator arrangement to bring the helmet into a predetermined target position.

14. A vehicle, comprising:
the neck protection system of claim 1; and
a control computer;
wherein the control computer is communicatively connected to the neck protection system and is configured to transmit the maneuver information of the vehicle to the neck protection system.

15. The vehicle of claim 14, wherein:
the vehicle is an aircraft; and
the control computer is a flight control computer of the aircraft.

* * * * *